US011779079B2

(12) United States Patent
Chen et al.

(10) Patent No.: US 11,779,079 B2
(45) Date of Patent: Oct. 10, 2023

(54) COMPOSITION OF HOT-MELT ADHESIVE FILM AND METHOD FOR PRODUCING SHOE SOLE

(71) Applicant: NATIONAL CHENG KUNG UNIVERSITY, Tainan (TW)

(72) Inventors: Chuh-Yung Chen, Tainan (TW); Cheng-Wei Huang, Taoyuan (TW); Meng-Heng Wu, Tainan (TW); Chao-Yu Lai, Taichung (TW); Yu-Ning Shu, Taipei (TW); Chen-Chien Wang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 916 days.

(21) Appl. No.: 16/550,276

(22) Filed: Aug. 25, 2019

(65) Prior Publication Data
US 2020/0060387 A1  Feb. 27, 2020

(30) Foreign Application Priority Data
Aug. 24, 2018 (WO) ................ PCT/CN2018/102178

(51) Int. Cl.
*A43B 13/32* (2006.01)
*C09J 7/35* (2018.01)
(Continued)

(52) U.S. Cl.
CPC ............ *A43B 13/32* (2013.01); *A43B 1/0063* (2013.01); *A43B 13/04* (2013.01); *A43B 13/125* (2013.01);
(Continued)

(58) Field of Classification Search
CPC ............ B29C 65/4815; B29C 65/1412; B29C 65/1425; A43D 25/20; A43B 13/32; B29D 35/122
See application file for complete search history.

(56) References Cited

U.S. PATENT DOCUMENTS

| 5,301,847 A * | 4/1994 | Fehr | .......................... B65B 3/32 222/309 |
| 6,379,497 B1 * | 4/2002 | Sandstrom | ............. D21H 21/22 162/137 |

(Continued)

FOREIGN PATENT DOCUMENTS

| CN | 1290314 A | | 4/2001 |
| CN | 1816274 A | * | 8/2006 |

(Continued)

OTHER PUBLICATIONS

Machine Translation of CN 104559843 A (Year: 2015).*
Machine Translation of CN 1816274 A (Year: 2006).*

*Primary Examiner* — Scott W Dodds
(74) *Attorney, Agent, or Firm* — CKC & Partners Co., LLC

(57) ABSTRACT

The present invention relates to a composition of a hot-melt adhesive film and a method for producing a shoe sole. The composition of the hot-melt adhesive film comprises a hot-melt adhesive material and an electromagnetic radiation absorbing material. The hot-melt adhesive material includes ethylene vinyl acetate and thermoplastic materials. The electromagnetic radiation absorbing material is uniformly dispersed in the hot-melt adhesive material. Energy of an electromagnetic radiation can be absorbed by the electromagnetic radiation absorbing material, thereby producing thermal energy, further increasing temperature and adhering property of the hot-melt adhesive film. Therefore, a midsole and an outsole of the shoe sole can be adhered by the
(Continued)

hot-melt adhesive film. Further, the hot-melt adhesive film is made from recyclable materials. Therefore, the hot-melt adhesive film is fully recyclable.

7 Claims, 13 Drawing Sheets

(51) Int. Cl.
    *C09J 7/10*     (2018.01)
    *B32B 37/12*     (2006.01)
    *C09J 5/06*     (2006.01)
    *A43B 1/00*     (2006.01)
    *A43B 13/04*     (2006.01)
    *A43B 13/12*     (2006.01)
    *B29D 35/12*     (2010.01)
    *A43D 25/20*     (2006.01)
    *B29K 101/12*     (2006.01)

(52) U.S. Cl.
    CPC .......... *A43D 25/20* (2013.01); *B29D 35/122* (2013.01); *B32B 37/1207* (2013.01); *C09J 5/06* (2013.01); *C09J 7/10* (2018.01); *C09J 7/35* (2018.01); *B29K 2101/12* (2013.01); *B32B 2037/1215* (2013.01); *B32B 2437/02* (2013.01); *C09J 2301/408* (2020.08); *C09J 2301/414* (2020.08); *C09J 2301/416* (2020.08); *C09J 2475/00* (2013.01)

(56) References Cited

U.S. PATENT DOCUMENTS

| | | | |
|---|---|---|---|
| 6,497,786 B1* | 12/2002 | Kilgore | B29D 35/00 |
| | | | 219/679 |
| 6,586,054 B2* | 7/2003 | Walsh | B29C 70/548 |
| | | | 427/430.1 |
| 2005/0274455 A1 | 12/2005 | Extrand | |
| 2010/0093942 A1 | 4/2010 | Silvis et al. | |
| 2015/0359043 A1 | 12/2015 | Kim et al. | |
| 2016/0374435 A1* | 12/2016 | Darland | A43B 13/04 |
| | | | 12/142 F |
| 2018/0235316 A1* | 8/2018 | Gonzalez de los Santo | |
| | | | A43B 13/12 |

FOREIGN PATENT DOCUMENTS

| | | |
|---|---|---|
| CN | 101681703 A | 3/2010 |
| CN | 101993673 A | 3/2011 |
| CN | 103522564 A | 1/2014 |
| CN | 104559843 A | 4/2015 |
| CN | 104620675 A | 5/2015 |
| CN | 104918768 A | 9/2015 |
| CN | 105801998 A | 7/2016 |
| CN | 106263291 A | 1/2017 |
| CN | 107245183 A | 10/2017 |
| CN | 107411239 A | 12/2017 |
| CN | 107418459 A | 12/2017 |
| CN | 107922791 A | 4/2018 |
| CN | 108192529 A | 6/2018 |
| CN | 108329850 A | 7/2018 |
| DE | 3930352 A1 | 3/1991 |
| DE | 102007007617 A1 | 8/2008 |
| EP | 0881066 A2 | 12/1998 |

* cited by examiner

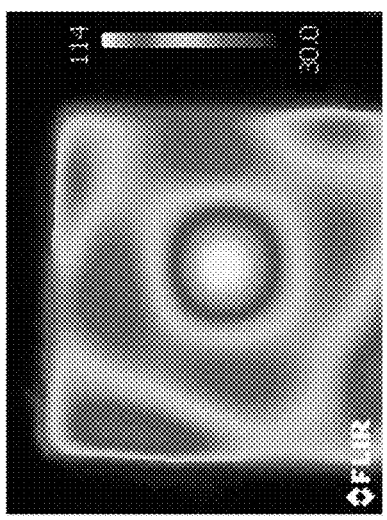
Fig. 6C
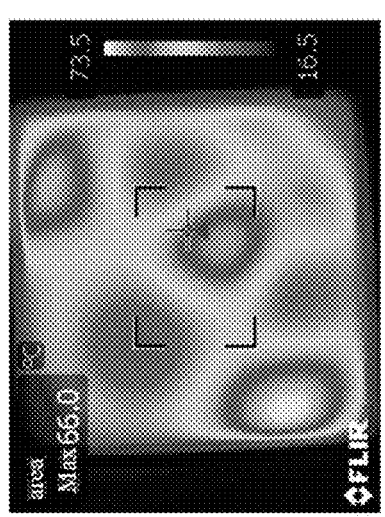
Fig. 6F
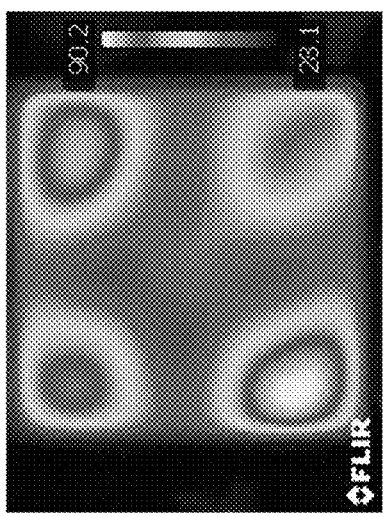
Fig. 6B
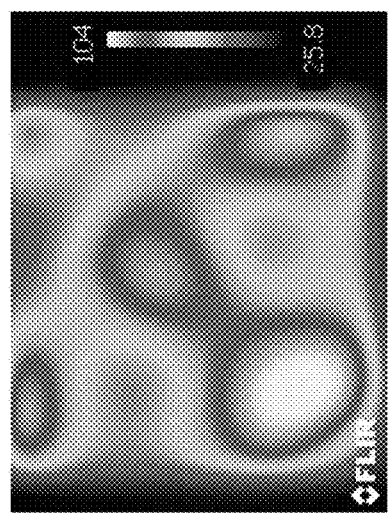
Fig. 6E
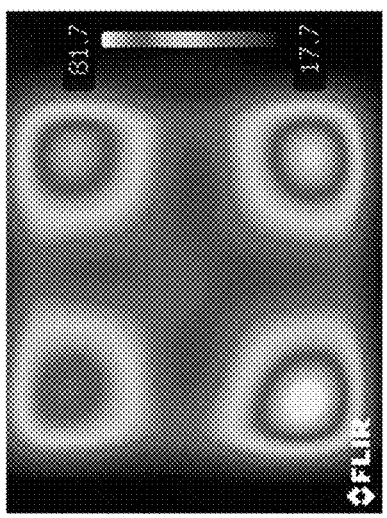
Fig. 6A
Fig. 6D

COMPOSITION OF HOT-MELT ADHESIVE FILM AND METHOD FOR PRODUCING SHOE SOLE

RELATED APPLICATION

This application claims priority to International Application No PCT/CN2018/102178, filed Aug. 24, 2018, which is herein incorporated by reference in its entirety.

BACKGROUND

Field of Invention

The present invention relates to a shoe sole. More particularly, the present invention relates to a hot-melt adhesive film of the shoe sole and a method of producing the shoe sole.

Description of Related Art

With improvement of a quality of a polymer material and a blending technique, production and a material of a shoe sole are also improved. Generally, the shoe sole is composed of a midsole and an outsole. The outsole contacts the ground to provide friction force, such that people can easily move. Therefore, the outsole must have excellent abrasion resistance. Moreover, the midsole acts as a support of shoes to absorb and buffer the reaction force generated while people moves, so as to protect the human body. Accordingly, the midsole and the outsole have very different properties, and they also have different functions.

Therefore, the midsole and the outsole cannot be integrally formed but they are bound by using a paste. However, when the midsole and the outsole are coated by exceeding paste, the residual paste may easily remain on the bound shoe sole and have a negative impact on the out-looking of the shoe sole. When the midsole and the outsole are coated by insufficient paste, the binding between the midsole and the outsole are not satisfactory, such that they may easily separate from each other. Users may feel unsatisfied when such situation occurs. Moreover, adhesion to the apparatus or other materials may occur because the adhesive property of the paste, and thus the paste lacks operational convenience.

In addition, in consideration of the environmental protection, the reusability of a product is also taken as an important property. However, a common shoe sole is not made from a recyclable material, and thus cannot be recycled and reused. Furthermore, it is difficult to further process the common shoe sole by other methods. Therefore, the known shoe sole does not have satisfactory reusability, and have a negative impact on the environment.

Accordingly, a composition of a hot-melt adhesive film and a method of producing a shoe sole are required, so as to improve the drawbacks of the known method.

SUMMARY

Therefore, an aspect of the present invention is to provide a composition of a hot-melt adhesive film. The composition has particular components, such that the midsole and the outsole may be efficiently bound, and convenience of producing the shoe sole may be improved. In addition, the composition of the hot-melt adhesive film may be efficiently heated by being exposed to the electromagnetic radiation, and have more satisfactorily adhesive property.

The other aspect of the present invention is to provide a method of producing a shoe sole. In the method, electromagnetic radiation is applied onto the hot-melt adhesive film formed of the composition of the hot-melt adhesive film, and then the hot-melt adhesive film may be used to bind the midsole and the outsole.

According to an aspect of the present invention, a composition of a hot-melt adhesive film is provided. The composition includes a hot-melt adhesive material and an electromagnetic radiation absorbing material. The hot-melt adhesive material includes ethylene vinyl acetate and a thermoplastic material. The electromagnetic radiation absorbing material is uniformly dispersed in the hot-melt adhesive material, in which the electromagnetic radiation absorbing material includes a microwave absorbing material and/or an infrared radiation absorbing material. The electromagnetic radiation absorbing material is able to absorb energy of the electromagnetic radiation and generates thermal energy.

In accordance with an embodiment of the present invention, the first polyurethane material comprises thermoplastic polyurethane.

In accordance with an embodiment of the present invention, the electromagnetic radiation absorbing material comprises a second polyurethane material.

In accordance with an embodiment of the present invention, the second polyurethane material is same as the first polyurethane material.

In accordance with an embodiment of the present invention, the thermoplastic material comprises a rosin compound.

In accordance with an embodiment of the present invention, based on an amount of the hot-melt adhesive material is 100 parts by weight, an amount of the ethylene vinyl acetate is 60 parts by weight to 100 parts by weight, an amount of the thermoplastic material is greater than 0 and smaller than or equal to 40 parts by weight, and an amount of the electromagnetic radiation absorbing material is 0.5 parts by weight to 40 parts by weight.

According to the other aspect of the present invention, a method of producing a shoe sole is provided. In the method, a midsole, an outsole and a hot-melt adhesive film are provided, in which the hot-melt adhesive film is formed from the aforementioned composition of the hot-melt adhesive film. Then, the hot-melt adhesive film is disposed between the midsole and the outsole, thereby forming a shoe sole material. The shoe sole material is disposed between a polypropylene top plate and a polypropylene bottom plate, and a binding process is performed. The binding process includes applying electromagnetic radiation onto the shoe sole material to heat the hot-melt adhesive film and bind the midsole and the outsole by the hot-melt adhesive film, thereby forming the shoe sole. The polypropylene top plate is arranged under a pressing element of a binding apparatus, and the polypropylene bottom plate is arranged on a rotary table of the binding apparatus. When the electromagnetic radiation is applied, the electromagnetic radiation absorbing material is able to absorb the energy of the electromagnetic radiation and generate the thermal energy to increase the temperature of the shoe sole. Then, the hot-melt adhesive film can be used to bind the midsole and the outsole, thereby forming the shoe sole.

In accordance with an embodiment of the present invention, a thickness of the polypropylene top plate is not smaller than the polypropylene bottom plate.

In accordance with an embodiment of the present invention, a distance between the pressing element and the rotary table is 4.5 centimeter (cm) to 7.5 cm.

In accordance with an embodiment of the present invention, before performing the binding process, the method further includes disposing the shoe sole material in a mold, in which the mold is located between the polypropylene top plate and the polypropylene bottom plate.

In accordance with an embodiment of the present invention, the shoe sole material is disposed on a centric position of the rotary table, or the shoe sole material is disposed on an eccentric position of the rotary table.

In accordance with an embodiment of the present invention, the polypropylene bottom plate is disposed on a centric position of the rotary table, or the polypropylene bottom plate is disposed on an eccentric position of the rotary table.

In accordance with an embodiment of the present invention, when a distance between the pressing element and the rotary table is smaller than a height of the shoe sole material, and after the hot-melt adhesive film is heated, the binding process further includes applying a pressure onto the shoe sole material using the polypropylene top plate and the polypropylene bottom plate.

Applying the composition of the hot-melt adhesive film and the method of producing the shoe sole of the present invention, the hot-melt adhesive film formed from the composition of the hot-melt adhesive film can efficiently absorb the energy of the electromagnetic radiation and convert the energy of the electromagnetic radiation into thermal energy, and then it can be used to bind the midsole and the outsole of the shoe sole. The convenience of producing the shoe sole may be improved. Besides, the hot-melt adhesive film is formed from a recyclable material, and thus the formed hot-melt adhesive film can be recycled and have satisfactory resource reusability.

BRIEF DESCRIPTION OF THE DRAWINGS

The invention can be more fully understood by reading the following detailed description of the embodiment, with reference made to the accompanying drawings as follows:

FIG. 6A through FIG. 6F are thermal imaging pictures of a hot-melt adhesive film formed when the shoe sole material and the polypropylene bottom plate are disposed in different positions in accordance with Example 6 of the present invention.

DETAILED DESCRIPTION

The following describes production and application of embodiments of the present invention. However, it is understood that the embodiments provide a variety of applicable concepts of the invention, in which the concepts can be implemented in a variety of particular examples. The particular embodiments mentioned herein are provided for clearance, and do not intend to limit the scope of the present invention.

Figure 1:
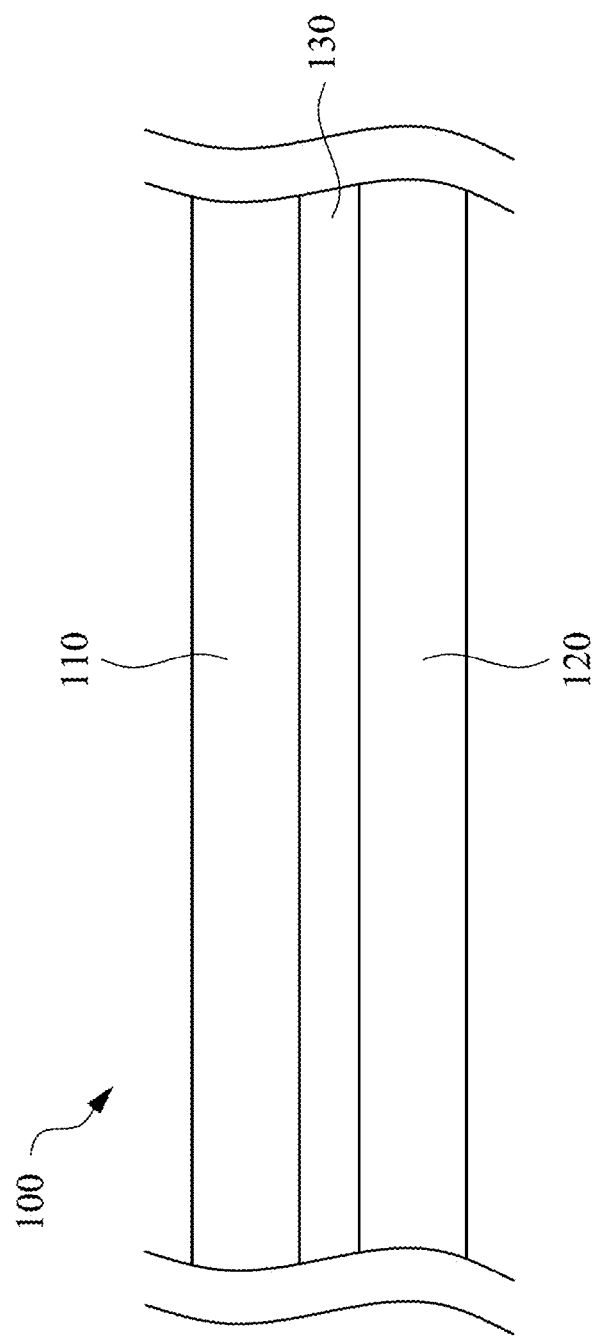
FIG. 1 is a schematic cross-section view showing a shoe sole in accordance with an embodiment of the present invention.

Please refer to FIG. 1. FIG. 1 is a schematic cross-section view showing a shoe sole in accordance with an embodiment of the present invention. In a shoe sole 100, the shoe sole 100 includes a midsole 110, an outsole 120 and a hot-melt adhesive film 130 that directly binds the midsole 110 and the outsole 120 together. The hot-melt adhesive film 130 is between the midsole 110 and the outsole 120. The midsole 110 is formed from a composition of a midsole material, the outsole 120 is formed from a composition of an outsole material, and the hot-melt adhesive film 130 is formed from a composition of a hot-melt adhesive film. The composition of the hot-melt adhesive film and a method of producing the shoe sole are described as follows.

Composition of Hot-Melt Adhesive Film

The composition of the hot-melt adhesive film may include a hot-melt adhesive material and an electromagnetic absorbing material. The hot-melt adhesive material includes ethylene vinyl acetate and a thermoplastic material. A content of a vinyl acetate group of the ethylene vinyl acetate may be 9% to 40%. When the content of the vinyl acetate group is in such range, the ethylene vinyl acetate and the thermoplastic material may have a better blending uniformity, and the hot-melt adhesive film may have better compatibility with the midsole. The thermoplastic material may include but is not limited to a first polyurethane material, a thermoplastic rubber (TPR), other suitable thermoplastic materials or a combination thereof. The first polyurethane material is thermoplastic polyurethane (TPU). In some examples, the thermoplastic rubber may be a copolymer of a styrene elastomer (e.g., styrene-butadiene-styrene block copolymer (SBS), styrene-ethylene/butylene-styrene block copolymer (SEBS), styrene-isoprene block copolymer (SIS), styrene-ethylene/propylene-styrene block copolymer (SEPS)), or the like).

Based on an amount of the hot-melt adhesive material is 100 parts by weight, an amount of the ethylene vinyl acetate is 60 parts by weight to 100 parts by weight, and an amount of the thermoplastic material is greater than 0 parts by weight and smaller than or equal to 40 parts by weight. Preferably, based on the amount of the hot-melt adhesive material is 100 parts by weight, the amount of the ethylene vinyl acetate is 75 parts by weight to 95 parts by weight, and the amount of the thermoplastic material is 0.5 parts by weight to 25 parts by weight. When the amounts of the ethylene vinyl acetate and the thermoplastic material are in such ranges, these two components may be uniformly blended, thereby improving an adhesive property.

In some embodiments, the thermoplastic material may optionally include a rosin compound. For example, the rosin compound may include pentaerythritol rosin ester. In some embodiments, the hot-melt adhesive material may include the composition of the midsole material for the midsole and the composition of the outsole material for the outsole, thereby improving the compatibility of the hot-melt adhesive film and the midsole, and the compatibility of the hot-melt adhesive film and the outsole, in which the midsole and the outside are to be bound together. As a result, the adhesive property of the hot-melt adhesive film toward the midsole and the outsole may be improved.

In some embodiments, the hot-melt adhesive material may optionally include other additives (e.g., a thickener or the like). In some examples, the thickener may include but is not limited to a natural resin compound. Based on the amount of the hot-melt adhesive material is 100 parts by weight, an amount of the natural resin compound may be greater than 0 parts by weight and smaller than or equal to 40 parts by weight. For example, the natural resin compound may be a compound of chinese lacquer, a compound of shellac, rosin polyester polyol, maleic anhydride rosin ester, other suitable natural resins or a combination thereof.

The electromagnetic radiation absorbing material is uniformly dispersed in the hot-melt adhesive material, and the electromagnetic radiation absorbing material may include microwave absorbing material, infrared radiation absorbing material, other suitable electromagnetic radiation absorbing material or a combination thereof. The microwave absorbing material and the infrared radiation absorbing material are not limited to particular species, as long as the material is able to absorb an energy of the electromagnetic radiation (i.e., the microwave and/or the infrared radiation and the like), and convert the energy into a thermal energy. In some embodiment, the electromagnetic radiation material may include a second polyurethane material. The second polyurethane material may be same as or different from the first polyurethane material. In some embodiments, the second urethane material may be a thermoplastic material and/or a thermosetting material. In some embodiment, the second polyurethane material is preferably thermoplastic polyurethane, which has a better recyclability. In some examples, the microwave absorbing material may include but is not limited to carbon black, silicon carbide, metal oxides (e.g., iron oxide, manganese dioxide), carbon fiber, inorganic clay, a nano material of nickel, other suitable microwave absorbing materials or a combination thereof. In some embodiments, the infrared radiation absorbing material may include an absorbing material of absorbable near-infrared radiation (NIR), a short wave, a fast medium wave, carbon infrared radiation (CIR), mid-infrared radiation (MIR), wrought iron pipe or the like. For example, the infrared radiation absorbing material may include but is not limited to carbon black, silicon carbide, metal oxides (e.g., iron oxide, manganese dioxide), carbon fiber, a nano material of nickel, other suitable infrared radiation absorbing material or a combination thereof.

It is understood that when the second polyurethane material is same as the first polyurethane material, the thermoplastic material merely contains the first polyurethane material, and the electromagnetic radiation absorbing material merely contains the second polyurethane material, the composition of the hot-melt adhesive material is composed of ethylene vinyl acetate and polyurethane material. The polyurethane material may act as the film material of the hot-melt adhesive film, and may further absorb the energy of the electromagnetic radiation to which the hot-melt adhesive material is exposed, and convert the energy of the electromagnetic radiation into the thermal energy. Furthermore, when thermoplastic polyurethane is used as the polyurethane material of both the first and second polyurethane materials, the thermoplastic urethane is able to properly blend with the ethylene vinyl acetate, such that the adhesive property of the hot-melt adhesive film is improved, and the hot-melt adhesive film has a more acceptable recyclability.

The nano material of nickel may include nickel nanowire, nickel nanoparticle, other suitable nano materials of nickel or a combination thereof. In some embodiments, the nano material of nickel may be, for example, the nickel nanowire having a structure of one-dimensional nanowire. In such embodiments, a specific surface area of the nickel nanowire is greater than or equal to 0.29 $m^2/g$. In some examples, the specific surface area of the nickel nanowire may be 0.3 $m^2/g$, 0.32 $m^2/g$ or 0.35 $m^2/g$.

A method of producing the nano material of nickel includes: preparation a nickel-ion solution, and adding a reducing agent into the nickel-ion solution, thereby forming a reaction solution. The nickel-ion solution is prepared by dissolving a nickel ion salt in deionized water. In some embodiments, the nickel ion salt may include but is not limited to nickel chloride, nickel nitrate, nickel hydroxide, other suitable nickel ion salts or a combination thereof. In some embodiments, the nickel-ion solution may optionally include an auxiliary agent. In these embodiments, the auxiliary agent may include but is not limited to carboxymethyl cellulose (CMC), sodium citrate, sodium hydroxide or a combination thereof. In some examples, based on an amount of the nickel-ion solution is 100 parts by weight, an amount of the CMC is 4 parts by weight to 6 parts by weight. For example, based on the amount of the nickel-ion solution is 100 parts by weight, an amount of the CMC is 4.5 parts by weight, 5 parts by weight or 6 parts by weight. In some examples, based on the amount of the nickel-ion solution is 100 parts by weight, an amount of the sodium citrate is 5 parts by weight to 9 parts by weight. In some specific examples, based on the amount of the nickel-ion solution is 100 parts by weight, an amount of the sodium hydroxide is 0.5 parts by weight to 2 parts by weight. In other embodiments, the auxiliary agent may be solid. When the solid auxiliary agent is added into the nickel-ion solution, the nickel-ion solution may be heated and stirred, such that the auxiliary agent may be completely dissolved in the nickel-ion solution.

The reducing agent may include but is not limited to hydrazine, hydrogen peroxide, other suitable reducing agent or a combination thereof. In some examples, based on the amount of the nickel-ion solution is 100 parts by weight, an amount of the reducing agent is 3 parts by weight to 9 parts by weight. For example, based on the amount of the nickel-ion solution is 100 parts by weight, the amount of the reducing agent is 3 parts by weight, 6 parts by weight or 9 parts by weight.

Next, a magnetic field is applied onto the prepared reaction solution, thereby forming the nano material of nickel. The magnetic field applied to the reaction solution may be 500 Gauss (G) to 5000 G, and time for applying the magnetic field may be 1 hour to 3 hours. For example, the time for applying the magnetic field may be 1 hour, 1.5 hours, 2 hours or 2.5 hours.

Based on the amount of the hot-melt adhesive material is 100 parts by weight, an amount of the electromagnetic radiation absorbing material is 0.5 parts by weight to 40 parts by weight; preferably, 0.5 parts by weight to 30 parts by weight; and more preferably, 0.5 parts by weight to 20 parts by weight. When the amount of the electromagnetic radiation absorbing material is in such range, aggregation of the electromagnetic radiation absorbing material may not easily occur, and thus the electromagnetic radiation absorbing material can be more uniformly dispersed in the hot-melt adhesive material. As a result, when microwave is applied onto the hot-melt adhesive material, an inner part of the hot-melt adhesive material can be more uniformly heated.

When producing the hot-melt adhesive film of the present invention, the hot-melt adhesive material and the electromagnetic radiation absorbing material may be blended by using a mixing extruder, and after extrusion-molded, forming the hot-melt adhesive film of the present invention.

Accordingly, the hot-melt adhesive film of the present invention can absorb the electromagnetic radiation applied thereon by the electromagnetic radiation absorbing material, such that the hot-melt adhesive film is efficiently heated and has excellent adhesive property. In addition, the hot-melt adhesive film not exposed to the electromagnetic radiation does not have adhesive property, and thus adhesion to the apparatus or other materials may not occur when laying the hot-melt adhesive film or implementing the process. As a result, the hot-melt adhesive film provides satisfactorily operational convenience.

Method of Producing Shoe Sole

Figure 2:
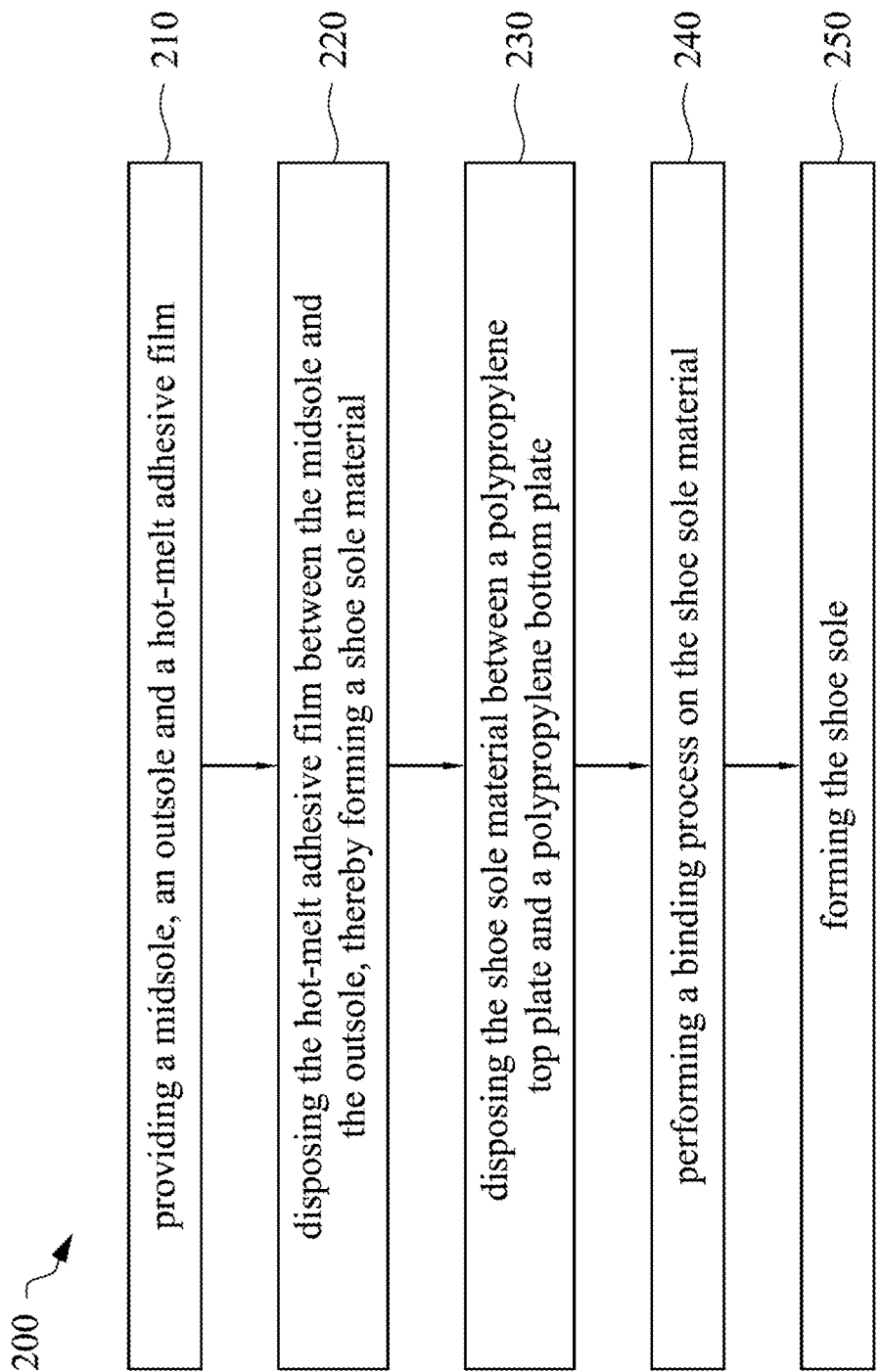
FIG. 2 is a schematic flowchart showing a method of producing a shoe sole in accordance with an embodiment of the present invention.
Figure 3A:
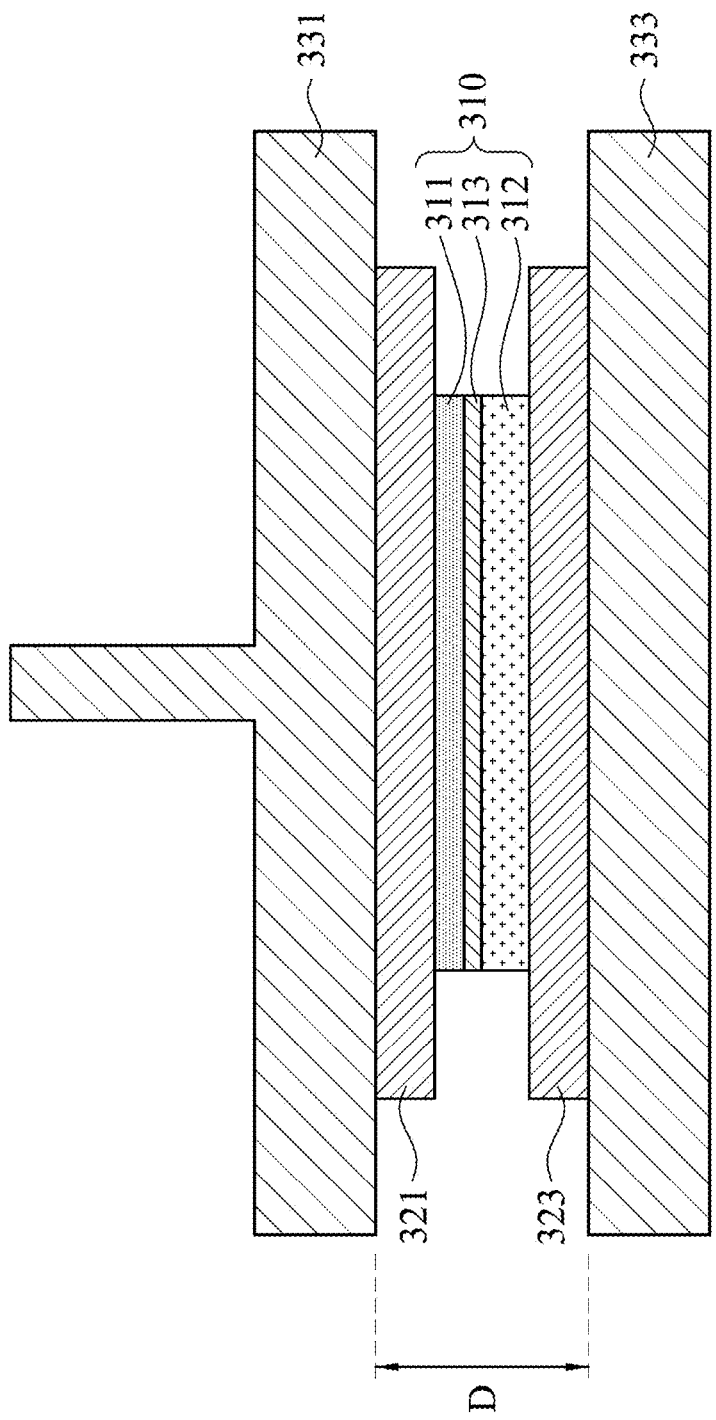
FIG. 3A is a schematic side cross-sectional view showing a binding apparatus that is performing a binding process in accordance with some embodiments of the present invention.

Please refer to FIG. 2 and FIG. 3A. FIG. 2 is a schematic flowchart showing a method of producing a shoe sole in accordance with an embodiment of the present invention. FIG. 3A is a schematic side cross-sectional view showing a binding apparatus that is performing a binding process in accordance with some embodiments of the present invention. In a method 200, a midsole 312 and an outsole 311 that are to be bound, and a hot-melt adhesive film 313 formed from the composition of the hot-melt adhesive film are provided first. The hot-melt adhesive film 313 is disposed between the midsole 312 and the outsole 311, thereby forming a shoe sole material 310, as shown in operation 210 and operation 220. Next, the shoe sole material 310 is disposed between a polypropylene top plate 321 and a polypropylene bottom plate 323, as shown in operation 230. The polypropylene top plate 321 is arranged under a pressing element 331 of the binding apparatus, and the polypropylene bottom plate 323 is arranged on a rotary table 333 of the binding apparatus. There is no limit of a material of the rotary table 333 of the present invention, as long as the rotary table 333 will not absorb the electromagnetic radiation in the binding process mentioned later. In some embodiments, the material of the rotary table 333 is a metal material, other suitable materials or a combination thereof. In some specific examples, a distance D between the pressing element 331 and the rotary table 333 may be 4.5 cm to 7.5 cm; preferably is 5.0 cm to 7.0 cm; and more preferably is 5.5 cm to 6.5 cm. When the distance D is in such range, the electromagnetic radiation can be efficiently absorbed by the electromagnetic radiation absorbing material, and is converted into the thermal energy to heat the hot-melt adhesive film for increasing the adhesive property of the hot-melt adhesive film. Besides, when the distance D of the pressing element 331 and the rotary table 333 is about 5.5 cm to 6 cm, the hot-melt adhesive film has a greater temperature increase rate.

After the operation 230 is performed, the binding process in performed onto the shoe sole material 310, thereby forming the shoe sole of the present invention, as shown in operation 240 and operation 250. In the binding process, the binding apparatus may apply the electromagnetic radiation to the shoe sole material to heat the hot-melt adhesive film, and then the shoe sole material 310 is bound. When the operation 240 is performed, a type and a wavelength of the applied electromagnetic radiation may be selected according to a type of the electromagnetic radiation absorbing material, so as to ensure that the radiation energy may be efficiently absorbed by the electromagnetic radiation absorbing material and converted into the thermal energy. Then, a temperature of the hot-melt adhesive film 313 may uniformly increase, such that the hot-melt adhesive film 313 has the adhesive property to bind the midsole 312 and the outsole 311.

As shown in FIG. 3A, the shoe sole material 310 contacts the polypropylene top plate 321, while the present invention is not limited to this embodiment. In some embodiments, the shoe sole material 310 contacts the polypropylene top plate 321, and is compressed by the polypropylene top plate 321 and the polypropylene bottom plate 323. Based on a height of the shoe sole material 310 that has not been compressed is 100%, a compression ratio of the shoe sole material 310 compressed by the polypropylene top plate 321 and the polypropylene bottom plate 323 may be greater than or equal to 60% and smaller than 100%. In other embodiments, the shoe sole material 310 may not contact the polypropylene top plate 321.

It is understood that when the shoe sole material 310 has been compressed, the polypropylene top plate 321 and the polypropylene bottom plate 323 can also apply pressure onto the shoe sole material 310 simultaneously during the binding process. Accordingly, when the electromagnetic radiation is applied onto the shoe sole material 310, the temperature of the hot-melt adhesive film may increase and the hot-melt adhesive film will have the adhesive property. When the pressure is further applied, the hot-melt adhesive film may effectively bind the outsole 311 and the midsole 312.

Besides, when the shoe sole material 310 is not compressed and the electromagnetic radiation is applied onto the shoe sole material 310, the hot-melt adhesive film 313 can still bind the outsole 311 and the midsole 312. However, in some embodiments, the binding process may optionally include an operation of applying pressure onto the shoe sole material 310 using the polypropylene top plate 321 and the polypropylene bottom plate 323, such that the adhesion of the hot-melt adhesive film 313 to the outsole 311 and the midsole 312 may be further improved. In some embodiments, when the pressure is applied onto the shoe sole material 310, the electromagnetic radiation may be continually applied to maintain the temperature of the hot-melt adhesive film 313, thereby ensuring the adhesion of the hot-melt adhesive film 313 to the outsole 311 and the midsole 312. In some embodiments, during the pressure is applied, the electromagnetic radiation may be initially applied while terminated then. Consequently, the hot-melt adhesive film 313 having the adhesive property may further permeate into slits between the outsole 311 and the midsole 312 based on the application of the pressure during the electromagnetic radiation is applied. When the application of the electromagnetic radiation is terminated, the hot-melt adhesive film may be gradually cooled to solidify and fix in the slits, thereby improving the adhesion of the hot-melt adhesive film 313 to the outsole 311 and the midsole 312. In other embodiments, when the pressure is applied onto the shoe sole material 310, the application of the electromagnetic radiation may be terminated, and the outsole 311 and the midsole 312 are bound by the hot-melt adhesive film 313 having the adhesive property given from the remaining temperature.

Figure 3B:
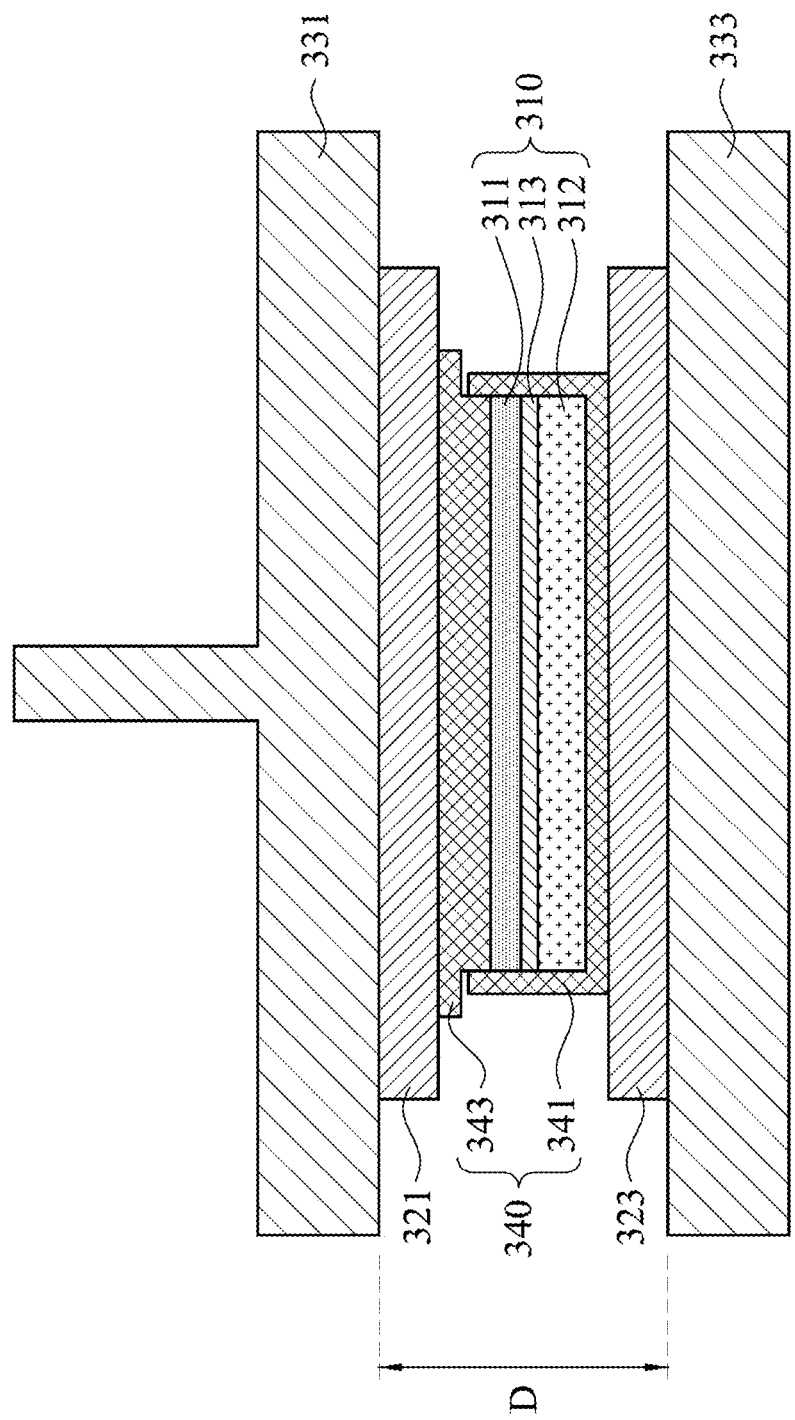
FIG. 3B is a schematic side cross-sectional view showing a binding apparatus that is performing a binding process in accordance with some embodiments of the present invention.

In some embodiment, as shown in FIG. 3B, when the operation 230 is performed, the shoe sole material 310 may be disposed in a mold 340, in which the mold 340 is disposed between the polypropylene top plate 331 and the polypropylene bottom plate 333, and the mold 340 includes a top mold 343 and a bottom mold 341. The shoe sole material 310 is disposed in a notch of the bottom mold 341, and the top mold 343 has a protruding pressing part (not shown) which corresponds to the notch of the bottom mold 341. In the following binding process (i.e., the operation 240), the pressing part is used to apply the pressure to the shoe sole material 310 to improve and ensure the adhesion of the hot-melt adhesive film to the outsole 311 and the midsole 312. In some embodiments, the pressing part and the notch of the bottom mold may be designed according to an outer profile of the shoe sole material 310, so as to improve the uniformity of applying the pressure during the pressure-assisted binding process. In some embodiments, the mold 340 may optionally have a top pressing plate and a bottom pressing plate that comply with the outer profile of the shoe sole material 310, in which the top pressing plate and the bottom pressing plate are disposed between the top mold 343 and the bottom mold 341, and the shoe sole material 310 is disposed between the top pressing plate and the bottom pressing plate. Consequently, the top mold 343 and the bottom mold 341 are applicable to bind the shoe sole materials 310 having different outer profiles by a combination of different top pressing plates and bottom pressing plates. Besides, the distance D and the height of the mold 340 where the shoe sole material 310 is disposed are same as those described in the shoe sole material 310 being compressed or not being compressed by the polypropylene top plate 331 and the polypropylene bottom plate 333, and may not be repeated herein.

In some embodiments, a material of the top mold 343 and the bottom mold 341 may be polypropylene or Teflon, and the top mold 343 and the bottom mold 341 may be a solid mold or a hollowed mold. When the top mold 343 and the bottom mold 341 are solid polypropylene molds, the shoe sole material 310 may be uniformly bind during the following binding process, thereby reducing defects of warpage or protrusion. In other embodiments, the material of at least one of the top mold 343 and the bottom mold 341 may be replaced with Teflon. When the binding process is performed, the hollowed Teflon molds may make the hot-melt adhesive film 313 be heated by the electromagnetic radiation more efficiently.

When the shoe sole material 310 is disposed in the mold 340, the mold 340 of the present invention does not block the electromagnetic radiation during the binding process. Therefore, it is ensured that the electromagnetic radiation is absorbed by the electromagnetic radiation absorbing material of the hot-melt adhesive film 313 in the mold 340, and the electromagnetic radiation is converted into the thermal energy.

Therefore, in the method of producing the shoe sole of the present invention, the hot-melt adhesive film 313 does not have the adhesive property before it is exposed to the electromagnetic radiation, such that the hot-melt adhesive film 313 may conveniently disposed between the midsole 312 and the outsole 311. However, when the hot-melt adhesive film 313 is exposed to the electromagnetic radiation, it has satisfactory adhesive property, and it may efficiently bind the midsole 312 and the outsole 311 together. Besides, the hot-melt adhesive film 313 between the midsole 312 and the outsole 311 may more efficiently bind the midsole 312 and the outsole 311 and improve the adhesion between the midsole 312 and the outsole 311 by applying the binding pressure on the midsole 312 and the outsole 311 disposed on two sides of the hot-melt adhesive film 313.

Figure 4A:
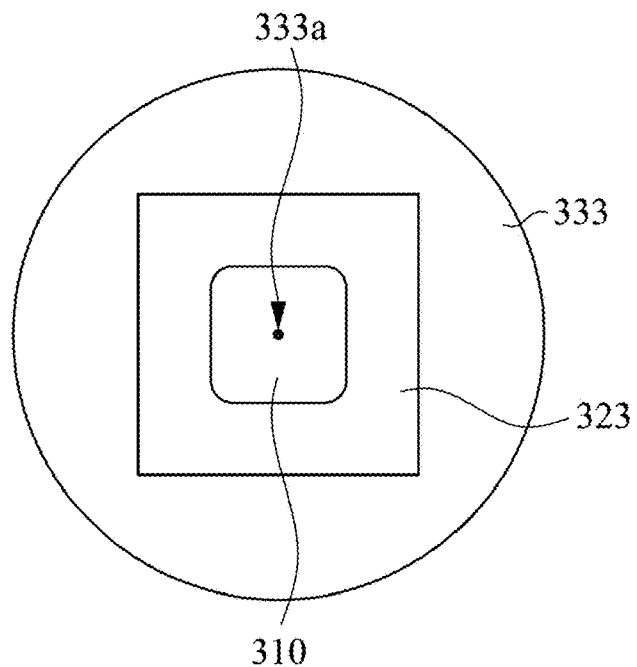
FIG. 4A to FIG. 4G are respectively schematic top views showing a relative position among a shoe sole material, a polypropylene bottom plate and a rotary table when a binding process is performed in accordance with some embodiments of the present invention.
Figure 4B:
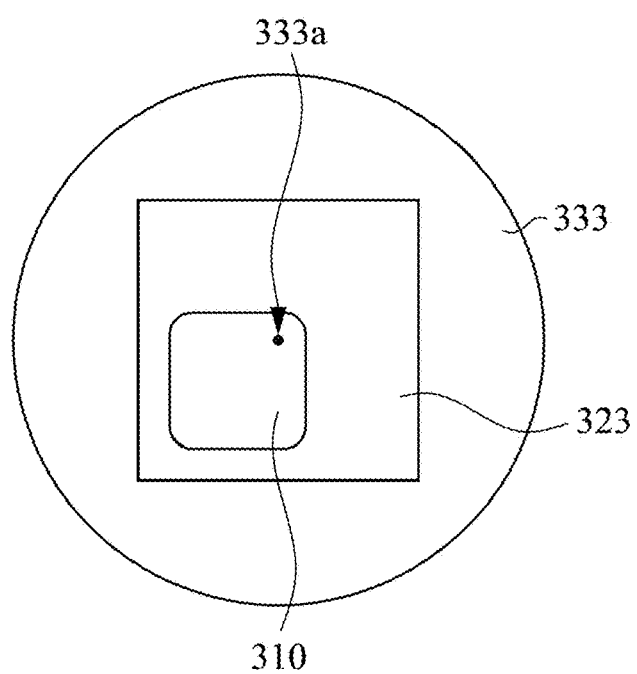
Figure 4C:
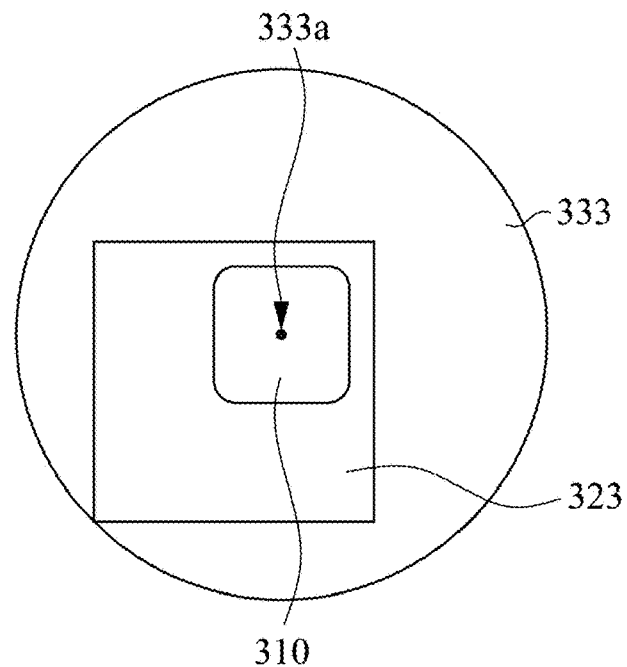
Figure 4D:
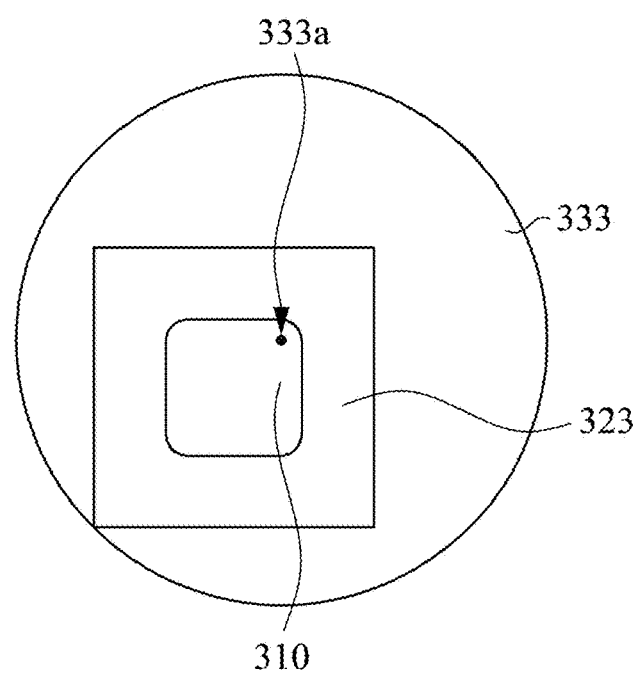
Figure 4E:
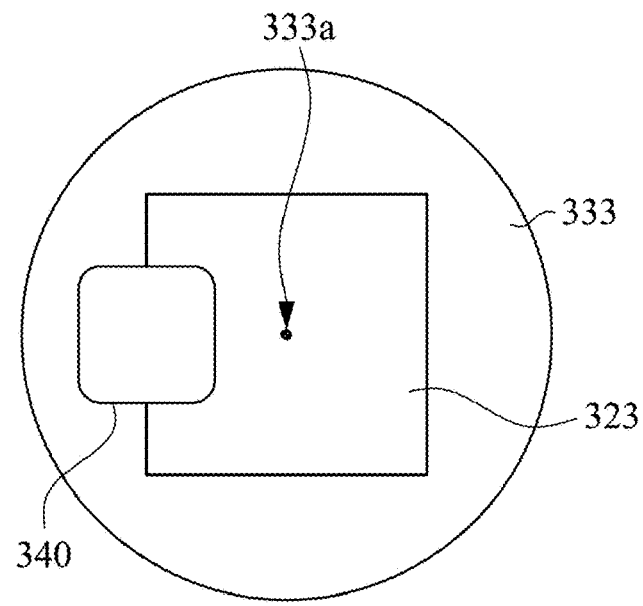
Figure 4F:
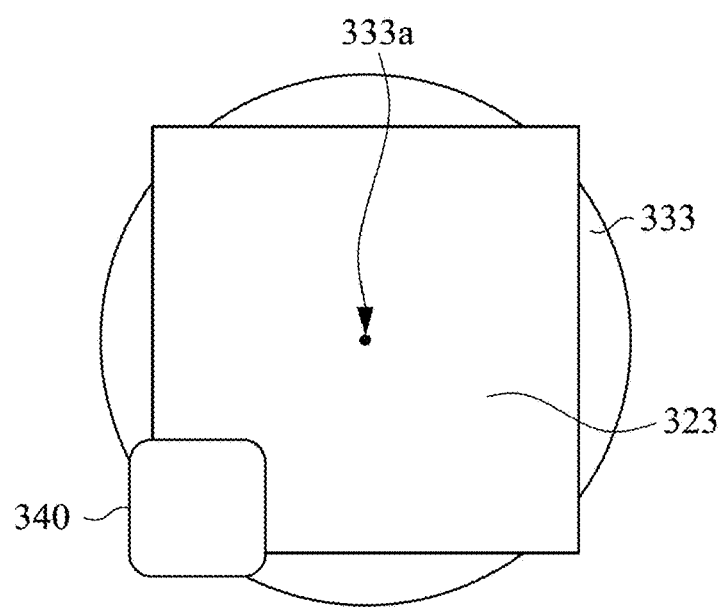

Please refer to FIG. 4A to FIG. 4F. FIG. 4A to FIG. 4F are respectively schematic top views showing a relative position among the shoe sole material 310, the polypropylene bottom plate 323 and the rotary table 333 when a binding process is performed in accordance with some embodiments of the present invention. These schematic top views are viewed from a bottom surface of the polypropylene top plate. The binding process in FIG. 4A to FIG. 4D is performed by the method described in FIG. 3A (i.e., the mold is not used). The binding process in FIG. 4E and FIG. 4F is performed by the method described in FIG. 3B (i.e., the mold is used), and thus the shoe sole material is disposed in the mold 340. It is noted that the binding process of FIG. 4A to FIG. 4D may also be performed by the method described in FIG. 3B.

The shoe sole material 310 is disposed on a centric position of the rotary table 333 in FIG. 4A and FIG. 4C, and the shoe sole material 310 or the mold 340 is disposed on an eccentric position of the rotary table 333 in FIG. 4B, FIG. 4D, FIG. 4E and FIG. 4F. It is understood that the term of "the centric position" is referred to as a center of a circle 333a of the rotary table 333, and the term of "the eccentric position" is referred to as a position out of the center. Accordingly, it is understood that a center of gravity of the shoe sole material 310 is aligned with the center of the circle of the rotary table 333, as shown in FIG. 4A; the center of gravity of the shoe sole material 310 is out of the center of the circle of the rotary table 333, as shown in FIG. 4B.

The polypropylene bottom plate 323 is disposed on the centric position of the rotary table 333 in FIG. 4A, FIG. 4B, FIG. 4E and FIG. 4F; and the polypropylene bottom plate 323 is disposed on the eccentric position of the rotary table 333. Similarly, the position where the polypropylene bottom plate 323 is disposed is determined by a center of gravity of the polypropylene bottom plate 323 and the center of circle 333a of the rotary table 333.

Besides, according to illustrations of FIG. 4E and FIG. 4F, the mold 340 protrudes from the polypropylene bottom plate 323, and thus the binding process is preferably performed by using the mold 340 to ensure that the binding pressure can be uniformly applied onto the shoe sole material in the mold 340. In addition, the polypropylene bottom plate 323 may also protrude from the rotary table 333 (as shown in FIG. 4F), such that a binding area of the binding apparatus may increase.

Because a common shoe sole has a rectangle-like shape which the length is greater than the width, the shoe sole material 310 may be tiltedly disposed on the polypropylene bottom plate 323 (i.e., an extending direction of the length is not perpendicular to a side of the polypropylene bottom plate 323). Accordingly, in some exemplary examples, an area of the polypropylene bottom plate 323 may be reduced.

According to the descriptions of FIG. 4A to FIG. 4G, there is no limit of the relative position among the shoe sole material 310 (or the mold 340), the polypropylene bottom plate 323 and the rotary table 333. When the shoe sole material 310 is disposed on the centric position of the rotary table 333, the electromagnetic radiation absorbing material in the composition of the hot-melt adhesive film can efficiently absorb the energy of the electromagnetic radiation and converts the energy of the electromagnetic radiation into the thermal energy to efficiently heat the hot-melt adhesive film. However, the centric position of the shoe sole material 310 has a lower heating temperature, which reduces the heating uniformity. When the shoe sole material 310 is disposed on the eccentric position of the rotary table 333, the shoe sole material 310 may also be efficiently heated and have a better heating uniformity. Therefore, a special structure of the shoe sole and/or the disposed position of the shoe sole material 310 may be adequately adjusted according to the profile of the shoe sole, and then it can be ensured that the hot-melt adhesive film is properly heated to improve the adhesive property of the hot-melt adhesive film to the midsole and the outsole.

In some exemplary examples, in the hot-melt adhesive film formed from the composition of the hot-melt adhesive film, the electromagnetic radiation absorbing material can absorb the energy of the electromagnetic radiation applied during the binding process, and converts the energy of the electromagnetic radiation into the thermal energy. Therefore, the hot-melt adhesive film may be efficiently heated to bind the midsole and the outsole.

In other exemplary examples, the method of producing the shoe sole can adjust the disposed position of the shoe sole material or the mold according to the design of the shoe sole, thereby efficiently and uniformly heating the hot-melt adhesive film in the shoe sole material. Besides, the distance between the pressing element and the rotary table of the binding apparatus may be adjusted, such that the shoe sole material can also be efficiently heated. A peel strength of the shoe sole of the present invention is preferably not less than 2 kg/cm.

Embodiments are shown as follows to describe the application of the present invention, while the embodiments are not used to limit the scope of the present invention. Various modifications and variations can be made to the structure of the present invention by those skilled in the art without departing from the scope or spirit of the invention.

Preparation of Hot-Melt Adhesive Film

Example 1

To form the hot-melt adhesive film of Example 1, the first polyurethane material was blended with ethylene vinyl acetate (a content of the vinyl acetate group was 26%) to form the hot-melt adhesive material of Example 1. Then, the second polyurethane material and the hot-melt adhesive material were blended and molded, thereby forming the hot-melt adhesive film of Example 1. The first polyurethane material and the second polyurethane material were both thermoplastic polyurethane, and a weight ratio of a total weight of the thermoplastic polyurethane to a weight of the ethylene vinyl acetate was 1:9.

Next, the hot-melt adhesive film of Example 1 was disposed between an ethylene vinyl acetate foam sheet (i.e., the midsole) and a rubber sheet, so as to form the shoe sole material. The shoe sole material was then disposed in the mold, and the mold having the shoe sole material was disposed between two polypropylene plates each of which had a thickness of 0.5 cm. The distance between the pressing element and the rotary table might be 6.2 cm or 5.7 cm.

The binding process was performed onto the mold of Example 1 (a microwave power was 3000 watts), in which the mold and the polypropylene bottom plate were both disposed on the centric position of the rotary table. After 40 seconds or 30 seconds, the temperature of the shoe sole material was measured by using a contactless temperature detector. The result was: when the distance was 6.2 cm, the highest temperature of the shoe sole material was 105° C. after 40 seconds; and when the distance was 5.7 cm, the highest temperature of the shoe sole material was 105° C. after 30 seconds.

Figure 5A:
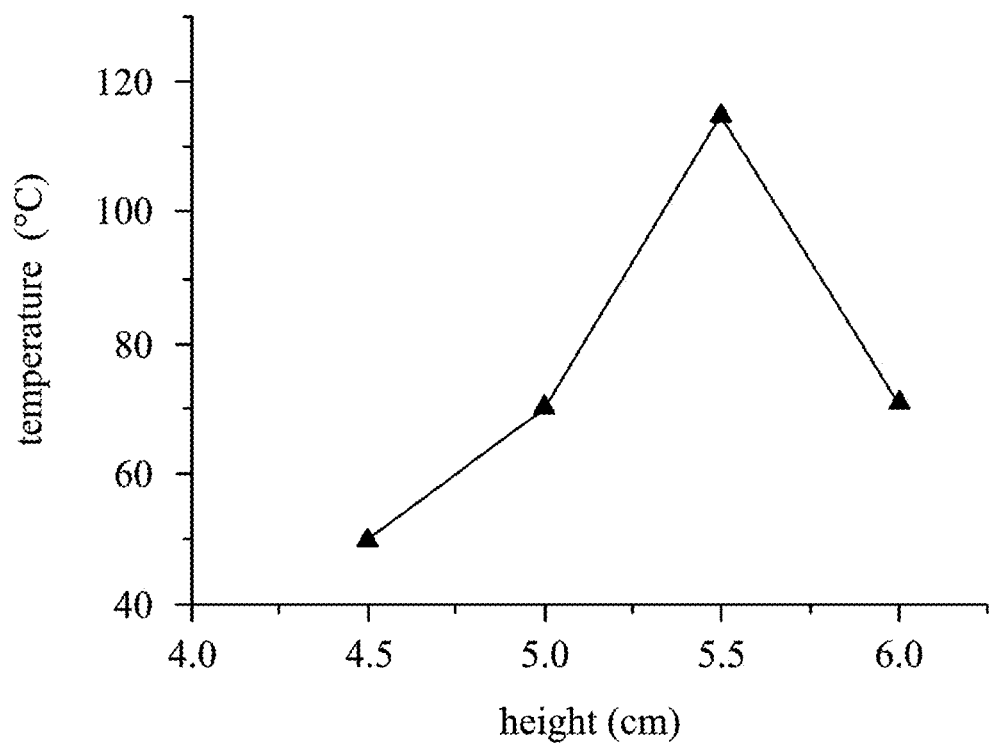
FIG. 5A is a line graph showing a variation of temperature of a shoe sole material in accordance with Example 1 of the present invention, in which the shoe sole material is disposed between a pressing element and a rotary table having different distances.

In addition, the distance of Example 1 was adjusted to 4.5 cm, 5 cm, 5.5 cm or 6 cm, and the binding process was respectively performed. After 40 seconds, the highest temperature of the respective shoe sole material was measured, and results of the variation of the temperature were shown in FIG. 5A.

Apparently, when the distance between the pressing element and the rotary table was 4.5 cm to 6.0 cm, the second polyurethane material could efficiently absorb the energy of the electromagnetic radiation, and converted the energy of the electromagnetic radiation into the thermal energy to increase the temperature of the hot-melt adhesive film.

Example 2

Example 2 was performed by the same process for producing the hot-melt adhesive film as that of Example 1. The difference was that a weight ratio of a total weight of the thermoplastic polyurethane to a weight of the ethylene vinyl acetate of Example 2 was 3:7.

In addition, Example 2 used the same flow for producing the shoe sole material as that of Example 1, and the shoe sole material was disposed in the mold. When the distance between the pressing element and the rotary was 6.2 cm, the highest temperature of the shoe sole material of Example 2 might be 121° C. after 40 seconds; when the distance between the pressing element and the rotary was 5.7 cm, the highest temperature of the shoe sole material of Example 2 might be 129° C. after 30 seconds.

Example 3

Example 3 was performed by the same process for producing the hot-melt adhesive film as that of Example 1. The difference was that a weight ratio of a total weight of the thermoplastic polyurethane to a weight of the ethylene vinyl acetate of Example 3 was 5:5.

In addition, Example 3 used the same flow for producing the shoe sole material as that of Example 1, and the shoe sole material was disposed in the mold. When the distance between the pressing element and the rotary was 6.2 cm, the highest temperature of the shoe sole material of Example 3 might be 126° C. after 40 seconds; when the distance between the pressing element and the rotary was 5.7 cm, the highest temperature of the shoe sole material of Example 3 might be 131° C. after 30 seconds.

Therefore, according to the results of the measurement of the temperature in Examples 1-3, the shoe sole material could be efficiently heated when a total content of the thermoplastic polyurethane increased, and the shoe sole material might have a higher temperature. Therefore, the thermoplastic polyurethane was able to absorb the electromagnetic radiation and converted the energy of the electromagnetic radiation into the thermal energy.

Example 4

Example 4 was performed by the same process for producing the hot-melt adhesive film as that of Example 1. The difference was that a content of the vinyl acetate group of the ethylene vinyl acetate was 33%. In addition, Example 4 used the same flow for producing the shoe sole material as that of Example 1, and the shoe sole material was disposed in the mold to perform the binding process. The distance between the pressing element and the rotary table might be 6.2 cm or 5.7 cm.

Then, the binding process was performed, and the temperature of the shoe sole material was measured in different time. The variations of the temperature were respectively shown in FIG. 5B (the distance was 6.2 cm) and FIG. 5C (the distance was 5.7 cm).

Example 5

Example 5 was performed by the same process for producing the hot-melt adhesive film as that of Example 2. The difference was that a content of the vinyl acetate group of the ethylene vinyl acetate was 33%. In addition, Example 5 used the same flow for producing the shoe sole material as that of Example 2, and the shoe sole material was disposed in the mold to perform the binding process. The distance between the pressing element and the rotary table might be 6.2 cm or 5.7 cm.

Then, the binding process was performed, and the temperature of the shoe sole material was measured in different time. The variations of the temperature were respectively shown in FIG. 5B and FIG. 5C.

Figure 5B:
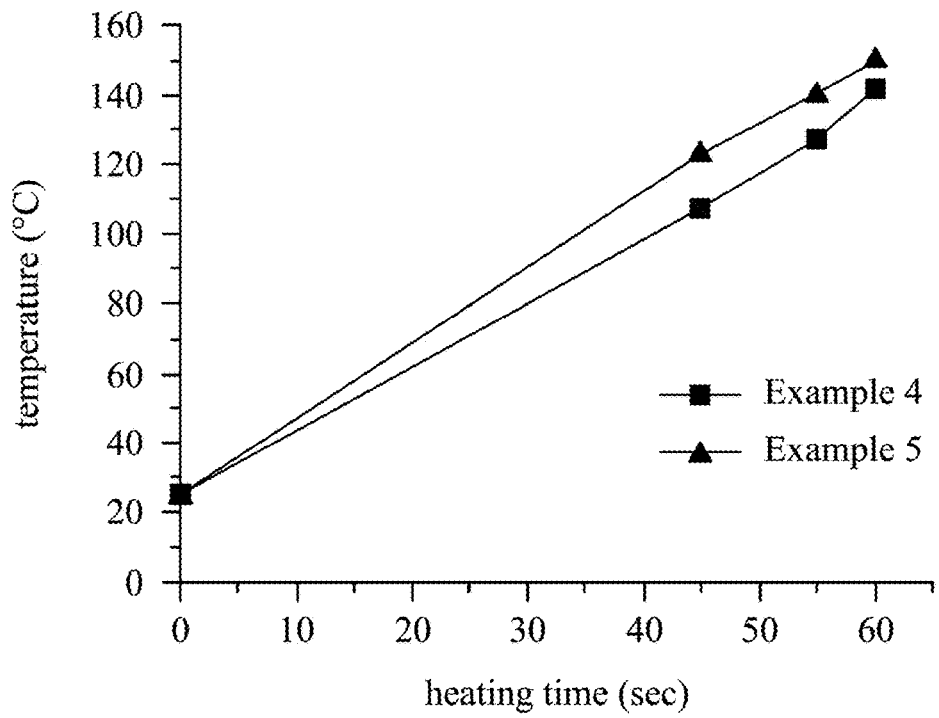
FIG. 5B is a line graph showing a variation of temperature of a shoe sole material under different heating time in accordance with Examples 4 and 5 of the present invention, in which a distance between a pressing element and a rotary table is 6.2 cm.
Figure 5C:
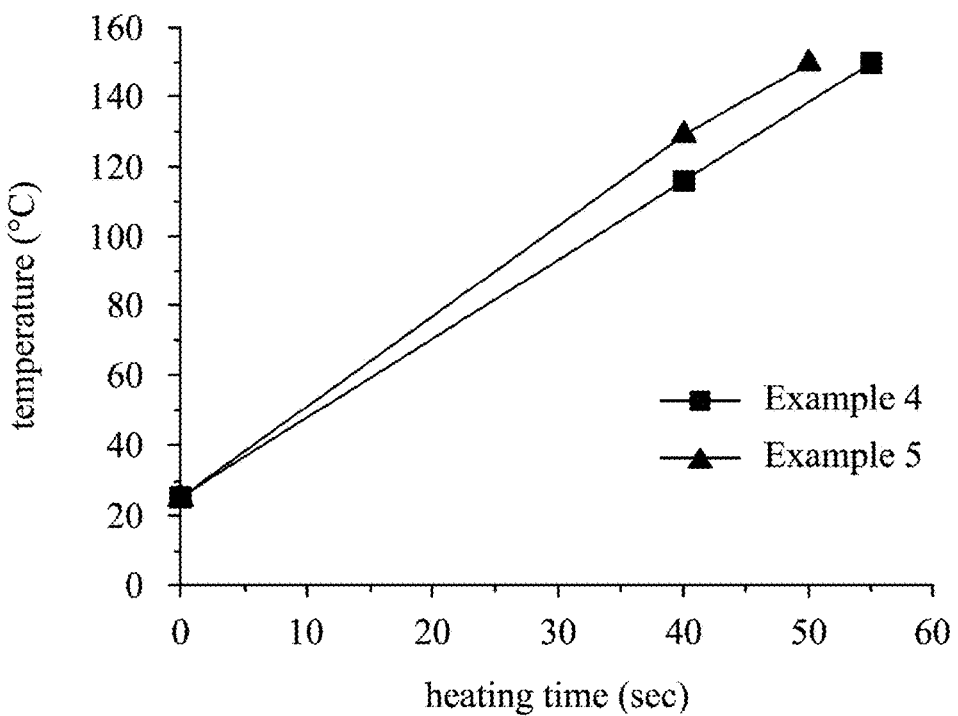
FIG. 5C is a line graph showing a variation of temperature of a shoe sole material under different heating time in accordance with Example 4 of the present invention, in which a distance between a pressing element and a rotary table is 5.7 cm.

According to FIG. 5B and FIG. 5C, when the content of the ethylene vinyl acetate increased, the hot-melt adhesive film could be efficiently heated by the electromagnetic radiation. Furthermore, according to FIG. 5B and FIG. 5C and the results of Examples 1 and 2, when the content of the ethylene vinyl acetate increased while the binding time and the distance were the same, the temperature of the shoe sole material was lower.

Example 6

To produce the hot-melt adhesive film of Example 6, the first polyurethane material was blended with ethylene vinyl acetate (a content of the vinyl acetate group was 33%) to form the hot-melt adhesive material of Example 6. Then, the second polyurethane, carbon black and silicon carbide were blended into the hot-melt adhesive material. The first polyurethane material and the second polyurethane material were both thermoplastic polyurethane, and a weight ration of a total weight of the thermoplastic polyurethane to a weight of the ethylene vinyl acetate was 1:9.

The hot-melt adhesive film of Example 6 was formed after the extrusion molding was performed. Then, the hot-melt adhesive film was disposed between an ethylene vinyl acetate foam sheet and a rubber sheet, so as to form the shoe sole material. Next, (1) the shoe sole material was directly disposed between two polypropylene plates each of which had a thickness of 0.5 cm, in which the distance between the pressing element and the rotary table was 6.2 cm. Or, (2) the shoe sole material was then disposed in the mold, and the mold having the shoe sole material was disposed between two polypropylene plates each of which had a thickness of 0.5 cm, in which the distance between the pressing element and the rotary table was 6.2 cm.

Then, the disposed positions of the shoe sole material (or the mold) and the polypropylene bottom plate with respect to the rotary table were adjusted, and the binding process was performed. The temperature of the shoe sole material was measured by the contactless temperature detector after 30 seconds, and thermal imaging pictures of the shoe sole material were shown as FIG. 6A through FIG. 6F.

In FIG. 6A, the shoe sole material with the mold and the polypropylene bottom plate were both disposed on the centric position of the rotary table (as described in FIG. 4A); in FIG. 6B, the shoe sole material with the mold was disposed on the eccentric position of the rotary table (separated from the center by 3.5 cm), and the polypropylene bottom plate was disposed on the centric position of the rotary table (as described in FIG. 4B); in FIG. 6C, the shoe sole material and the polypropylene bottom plate were both disposed on the centric position of the rotary table (as described in FIG. 4A); in FIG. 6D, the shoe sole material was disposed on the eccentric position of the rotary table (separated from the center by 3.5 cm), and the polypropylene bottom plate was disposed on the centric position of the rotary table (as described in FIG. 4B); in FIG. 6E, the shoe sole material and the polypropylene bottom plate were both disposed on the eccentric position of the rotary table (separated from the center by 3.5 cm, and as described in FIG. 4D); in FIG. 6F, the polypropylene bottom plate was disposed on the centric position of the rotary table, and the shoe sole material with the mold protruded from the polypropylene bottom plate (as described in FIG. 4F).

According to the picture of FIG. 6A, the temperature of the shoe sole material might be 17.7° C. to 81.7° C., and the highest temperature was 81.7° C.; according to the picture of FIG. 6B, the temperature of the shoe sole material might be 28.1° C. to 90.2° C., and the highest temperature was 90.2° C.; according to the picture of FIG. 6C, the temperature of the shoe sole material might be 30.4° C. to 114° C., and the highest temperature was 114° C.; according to the picture of FIG. 6D, the temperature of the shoe sole material might be 18.9° C. to 103° C., and the highest temperature was 103° C.; according to the picture of FIG. 6E, the temperature of the shoe sole material might be 25.8° C. to 104° C., and the highest temperature was 104° C.; and, according to the picture of FIG. 6F, the temperature of the shoe sole material might be 16.5° C. to 73.5° C., and the highest temperature was 66.0° C.

Therefore, when the shoe sole material (or the mold) is out of the centric position of the rotary table, the shoe sole material may have a different temperature distribution, which can combine with other distributions, such that the shoe sole material may be heated more completely to improve the quality of the binding process. In addition, when the shoe sole material is directly disposed between the polypropylene plates to perform the binding process, the shoe sole material may be directly exposed to the electromagnetic radiation, such that the shoe sole material may have a higher temperature.

Example 7

To produce the hot-melt adhesive film of Example 7, the first polyurethane material was blended with ethylene vinyl acetate (a content of the vinyl acetate group was 33%) to form the hot-melt adhesive material of Example 7. Then, the second polyurethane material and the hot-melt adhesive material were blended and molded. The first polyurethane material and the second polyurethane material were both thermoplastic polyurethane, and a weight ratio of a total weight of the thermoplastic polyurethane to a weight of the ethylene vinyl acetate was 1:9.

The hot-melt adhesive film of Example 7 was formed after the extrusion molding was performed. Then, the hot-melt adhesive film was disposed between an ethylene vinyl acetate foam sheet and a rubber sheet, so as to form the shoe sole material. Next, the shoe sole material was directly disposed between the polypropylene top plate (a thickness of 4 cm or 4.5 cm) and the polypropylene bottom plate (a thickness of 1 cm), in which the distance between the pressing element and the rotary table was 6.2 cm or 6.7 cm. A top surface of the shoe sole material was rectangle shape, and its length was equal to a length of the polypropylene top plate (a top surface was square shape).

Then, the disposed positions of the shoe sole material (or the mold) and the polypropylene bottom plate with respect to the rotary table were adjusted, and the binding process was performed. The temperature of the shoe sole material was measured by the contactless temperature detector, and thermal imaging pictures of the shoe sole material were shown as FIG. 7A through FIG. 7E.

Figure 4G:
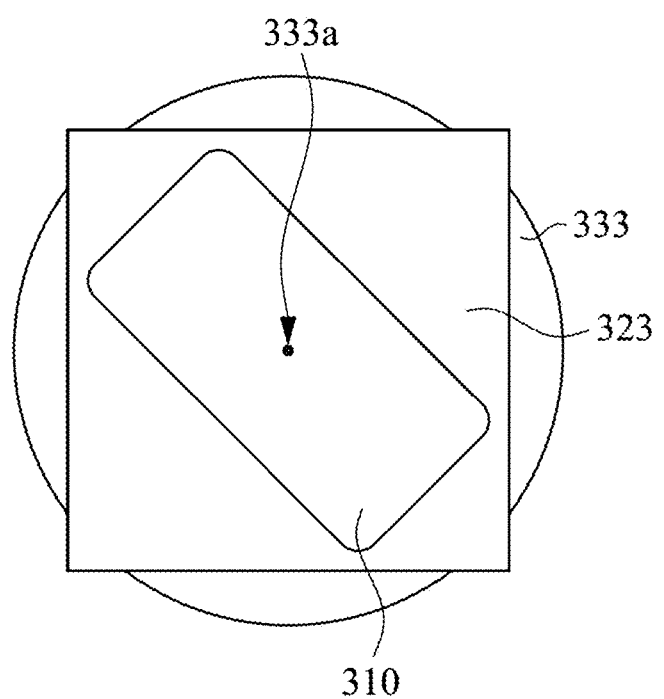
Figure 7A:
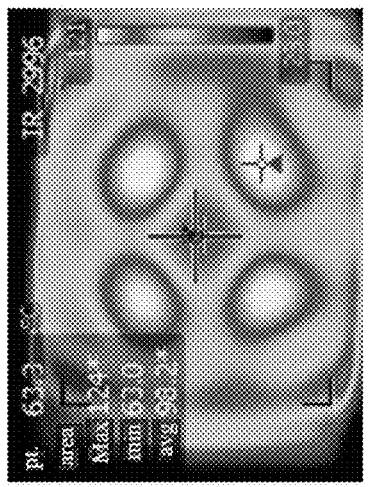
FIG. 7A through FIG. 7E are thermal imaging pictures of a hot-melt adhesive film formed when the shoe sole material and the polypropylene bottom plate are disposed in different positions in accordance with Example 7 of the present invention.
Figure 7B:
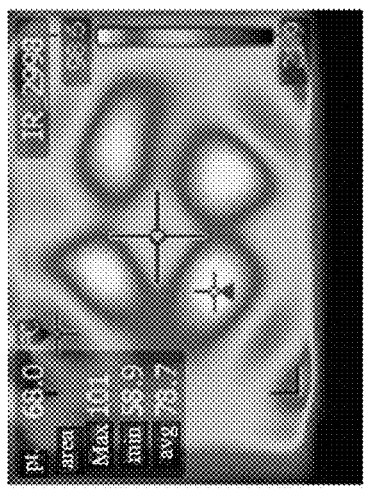
Figure 7C:
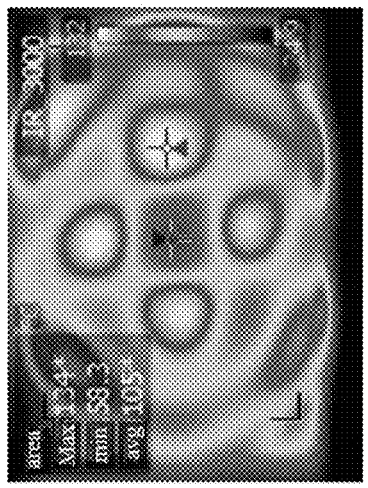

In FIG. 7A and FIG. 7B, the shoe sole material and the polypropylene bottom plate were both disposed on the centric position of the rotary table, and a long side of the shoe sole material was perpendicular to one side of the polypropylene plate, in which a thickness of the polypropylene top plate was 4 cm (FIG. 7A) or 4.5 cm (FIG. 7B), and the distance between the pressing element and the rotary table was 6.2 cm (FIG. 7A) or 6.7 cm (FIG. 7B); in FIG. 7C, the shoe sole material and the polypropylene bottom plate were both disposed on the centric position of the rotary table, and the shoe sole material was tiltedly disposed on the polypropylene bottom plate (as shown in FIG. 4G), in which the thickness of the polypropylene top plate was 4 cm and the distance between the pressing element and the rotary table was 6.2 cm. In addition, each binding process of FIG. 7A to FIG. 7C was performed for 30 seconds.

Figure 7D:
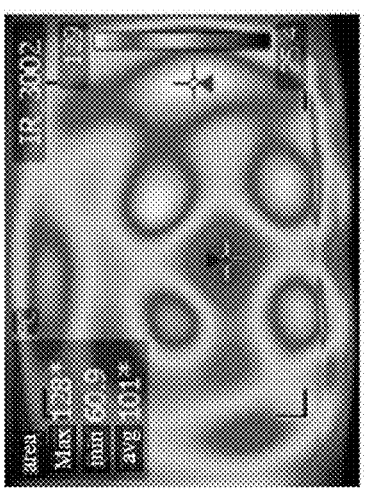
Figure 7E:
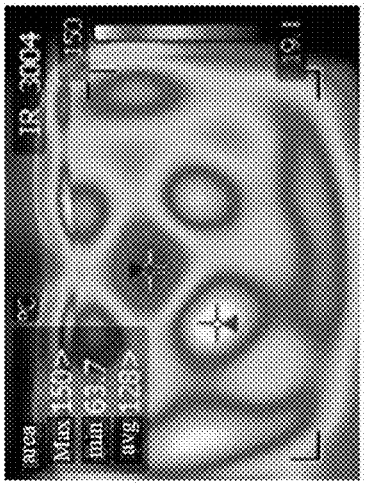

In FIG. 7D and FIG. 7E, the polypropylene bottom plate was disposed on the centric position of the rotary table, but the shoe sole material was disposed on the eccentric position of the rotary table. The long side of the shoe sole material was aligned with one side of the polypropylene bottom plate, in which the thicknesses of the polypropylene top plates were both 4 cm, and the distances between the pressing plates and the rotary tables were both 6.2 cm. In addition, the binding process of FIG. 7D was performed for 60 seconds, and the binding process of FIG. 7E was performed for 90 seconds.

According to the picture of FIG. 7A, the highest temperature was 124° C., the lowest temperature was 63.0° C., and the average temperature was 98.2° C.; according to the picture of FIG. 7B, the highest temperature was 101° C., the lowest temperature was 58.9° C., and the average temperature was 78.7° C.; according to the picture of FIG. 7C, the highest temperature was 134° C., the lowest temperature was 58.3° C., and the average temperature was 105° C.; according to the picture of FIG. 7D, the highest temperature was 128° C., the lowest temperature was 60.9° C., and the average temperature was 101° C.; according to the picture of FIG. 7E, the highest temperature was 150° C., the lowest temperature was 63.7° C., and the average temperature was 128° C.

According to FIG. 7A and FIG. 7B, when the distance between the pressing element and the rotary table increased, the temperature of the shoe sole material decreased. Compared to FIG. 7A, the shoe sole material of FIG. 7C was titledly disposed, such that the shoe sole material protruded from the polypropylene bottom plate and had a higher temperature. In FIG. 7D and FIG. 7E, the shoe sole material had a higher temperature with increase of the time of the binding process, and had a better temperature uniformity.

Besides, according to FIG. 7A to FIG. 7E, a better heating efficiency might be achieved by adjusting the distance between the pressing element and the rotary table when the shoe sole material was directly disposed between the two polypropylene plates.

Example 8

Example 8 was performed by the same process for producing the hot-melt adhesive film as that of Example 1. The difference was that a weight ratio of a total weight of the thermoplastic polyurethane to a weight of the ethylene vinyl acetate of Example 8 was 1:9 or 5:5, and the hot-melt adhesive material of Example 8 further includes 10 parts by weight of rosin ester.

Next, the hot-melt adhesive film of Example 8 was disposed between an ethylene vinyl acetate foam sheet and a rubber sheet, so as to form a square shoe sole material. The shoe sole material was then disposed in the mold, and the mold having the shoe sole material was disposed between two polypropylene plates each of which had a thickness of 0.5 cm. An initial distance between the pressing element and the rotary table was 5.86 cm, and the height of the mold was 4 cm (i.e. the polypropylene top plate did not contact the mold).

Then, the binding process was performed onto the mold of Example 8 (a microwave power was 3000 watts), in which the mold and the polypropylene bottom plate were both disposed on the centric position of the rotary table, and the distance between the pressing plate and the rotary table was adjusted to 6.2 cm. After 63 seconds, the distance between the pressing element and the rotary table was adjusted to 5.7 cm and the electromagnetic radiation was continually applied. After 56 more seconds, the electromagnetic radiation was turned off, thereby forming the shoe sole of Example 8.

Figure 8A:
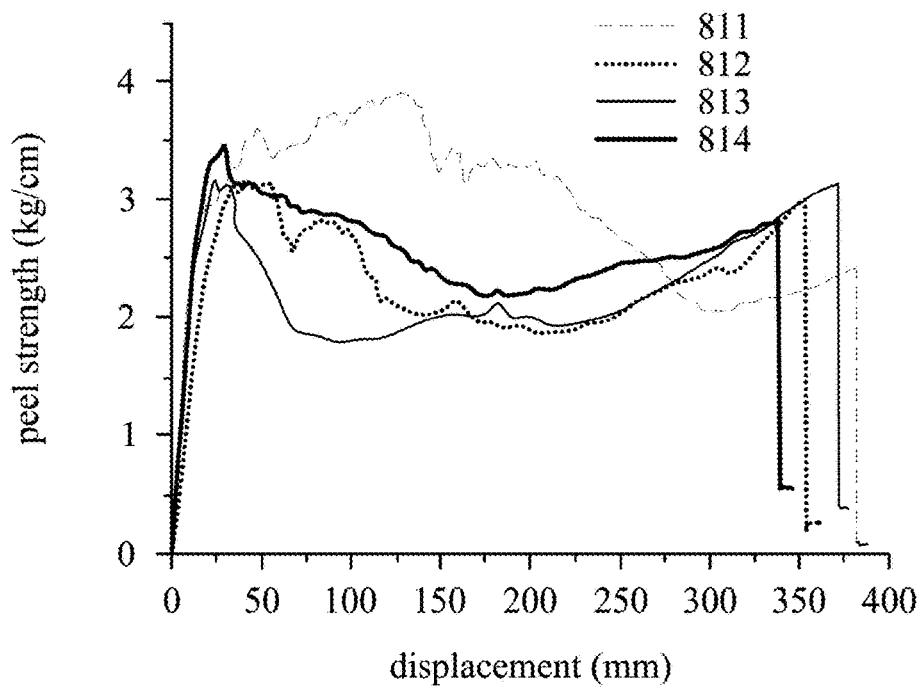
FIG. 8A and FIG. 8B are test results showing a peel strength of a shoe sole in accordance with Example 8 of the present invention.
Figure 8B:
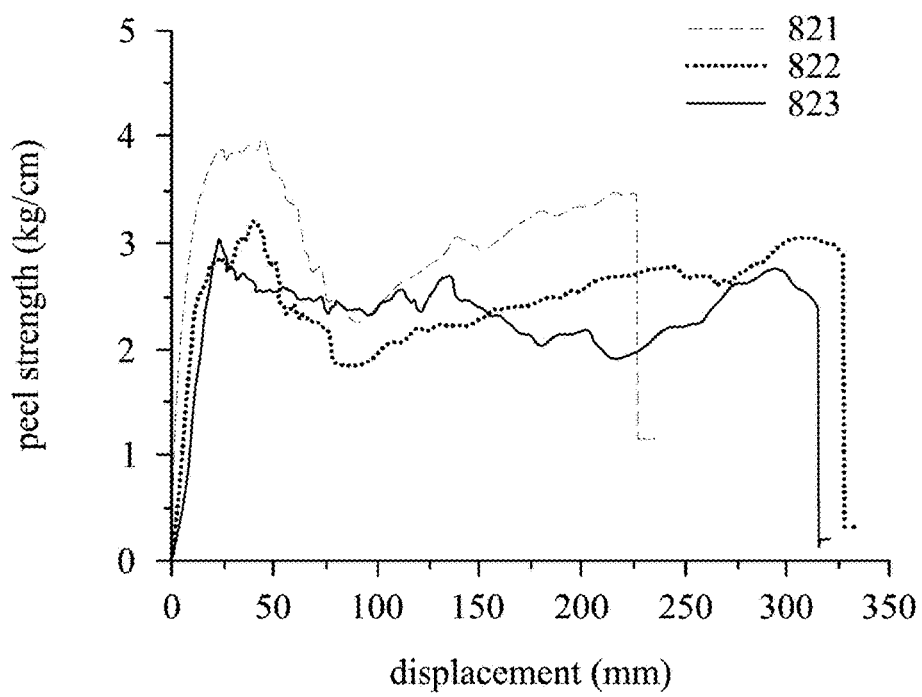

The shoe sole of Example 8 was cut along its edge, so as to divide the shoe sole into four equal parts of rectangle test sheets. Two test sheets on the edge were respectively labelled by a first region and a fourth region, and two test sheets on the centric position were labelled by a second region and a third region. Then, the peel strength of these test sheets were measured by a common method, and the results were shown in FIG. 8A and FIG. 8B. FIG. 8A is a test result that a weight ratio of a total weight of thermoplastic polyurethane to a weight of ethylene vinyl acetate is 1:9, and FIG. 8B is a test result that a weight ratio of a total weight of thermoplastic polyurethane to a weight of ethylene vinyl acetate is 5:5. In addition, a line 811 and a line 821 respectively represent the result of the shoe sole test sheets of the first region, a line 812 and a line 822 respectively represent the result of the shoe sole test sheets of the second region, a line 813 and a line 823 respectively represent the result of the shoe sole test sheets of the third region, and a line 814 represents the result of the shoe sole test sheets of the fourth region.

According to the results of FIG. 8A and FIG. 8B, the peel strength of every region of the shoe sole of the present invention was not smaller than 2 kg/cm, and thus the shoe sole of the present invention could satisfy the requirement of the application. Besides, according to the test result of Example 8, when the hot-melt adhesive material had the thermoplastic polyurethane, the electromagnetic radiation had to be applied for at least greater than 85 seconds (e.g., a combination of 45 seconds for not applying pressure and 40 seconds for applying pressure, or other combinations of the time), to ensure the binding effect of the hot-melt adhesive film.

According to the aforementioned description, the composition of the hot-melt adhesive film of the present invention includes the electromagnetic radiation absorbing material, and thus it is able to absorb the energy of the electromagnetic radiation and convert the energy of the electromagnetic radiation into the thermal energy to increase the temperature of the hot-melt adhesive film. Therefore, the adhesive property of the hot-melt adhesive film may be improved to bind the midsole and the outsole.

Moreover, the hot-melt adhesive film of the present invention is formed from a recyclable material. Therefore, the hot-melt adhesive material may be recycled and have satisfactory resource reusability.

Besides, in the method of producing the shoe sole of the present invention, the midsole and the outsole of the shoe sole material may be bound by performing the binding process on the hot-melt adhesive film of the shoe sole material and the hot-melt adhesive film is exposed to the electromagnetic radiation. The heating effect of the hot-melt adhesive film is affected by the disposed position of the shoe sole material (or the mold) on the rotary table of the binding apparatus.

Although the present invention has been described in considerable detail with reference to certain embodiments thereof; however, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method of producing a shoe sole, the method comprising:
   providing a midsole and an outsole;
   providing a hot-melt adhesive film, wherein the hot-melt adhesive film is formed from a composition of the hot-melt adhesive film, the composition of the hot-melt adhesive film comprises:
      a hot-melt adhesive material, comprising:
         an ethylene vinyl acetate; and
         a thermoplastic material, comprising a first polyurethane material and/or a thermoplastic rubber; and
      an electromagnetic radiation absorbing material, uniformly dispersed in the hot-melt adhesive material, wherein the electromagnetic radiation absorbing material comprises a microwave absorbing material and/or an infrared radiation absorbing material, the electromagnetic radiation absorbing material includes a nano material of nickel, and
      based on an amount of the hot-melt adhesive material is 100 parts by weight, an amount of the electromagnetic radiation absorbing material is 0.5 parts by weight to 40 parts by weight;
   disposing the hot-melt adhesive film between the midsole and the outsole, thereby forming a shoe sole material; and
   disposing the shoe sole material between a polypropylene top plate and a polypropylene bottom plate, and performing a binding process, wherein the binding process comprises applying an electromagnetic radiation onto the shoe sole material to heat the hot-melt adhesive film and binding the midsole and the outsole by the hot-melt adhesive film, thereby forming the shoe sole, wherein the polypropylene top plate is arranged under a pressing element of a binding apparatus, and the polypropylene bottom plate is arranged on a rotary table of the binding apparatus.

2. The method of producing the shoe sole of claim 1, wherein a thickness of the polypropylene top plate is not smaller than the polypropylene bottom plate.

3. The method of producing the shoe sole of claim 1, wherein a distance between the pressing element and the rotary table is 4.5 centimeter (cm) to 7.5 cm.

4. The method of producing the shoe sole of claim 1, wherein before performing the binding process, the method further comprises:
   disposing the shoe sole material in a mold, wherein the mold is located between the polypropylene top plate and the polypropylene bottom plate.

5. The method of producing the shoe sole of claim 1, wherein the shoe sole material is disposed on a centric position of the rotary table, or the shoe sole material is disposed on an eccentric position of the rotary table.

6. The method of producing the shoe sole of claim 5, wherein the polypropylene bottom plate is disposed on a centric position of the rotary table, or the polypropylene bottom plate is disposed on an eccentric position of the rotary table.

7. The method of producing the shoe sole of claim 1, wherein when a distance between the pressing element and the rotary table is smaller than a height of the shoe sole material, and after the hot-melt adhesive film is heated, the binding process further comprises:
   applying a pressure onto the shoe sole material by using the polypropylene top plate and the polypropylene bottom plate.

* * * * *